United States Patent
Yoshimura

(10) Patent No.: US 8,251,516 B2
(45) Date of Patent: Aug. 28, 2012

(54) PROJECTION DISPLAY DEVICE AND OPTICAL SYSTEM MODULATING SEPARATED P-POLARIZED LIGHT AND S-POLARAZED LIGHT

(75) Inventor: Makoto Yoshimura, Yokohama (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 896 days.

(21) Appl. No.: 12/289,943

(22) Filed: Nov. 7, 2008

(65) Prior Publication Data
US 2010/0118214 A1    May 13, 2010

(30) Foreign Application Priority Data

Nov. 7, 2007   (JP) .................................. 2007-289900

(51) Int. Cl.
| | |
|---|---|
| G03B 21/14 | (2006.01) |
| G03B 21/28 | (2006.01) |
| G02F 1/00 | (2006.01) |
| G02F 1/1335 | (2006.01) |
| G02F 1/03 | (2006.01) |
| G02F 1/07 | (2006.01) |
| H04N 5/74 | (2006.01) |
| G02B 5/30 | (2006.01) |
| G02B 27/28 | (2006.01) |

(52) U.S. Cl. ................. 353/81; 353/20; 353/33; 353/84; 348/752; 348/767; 349/96; 359/246; 359/487.01

(58) Field of Classification Search ..................... 353/31, 353/20, 81, 33, 84; 348/752, 767; 349/96; 359/246, 487.01
See application file for complete search history.

(56) References Cited

U.S. PATENT DOCUMENTS

| | | | | |
|---|---|---|---|---|
| 6,827,452 | B2* | 12/2004 | Tzong et al. | 353/33 |
| 6,847,476 | B2* | 1/2005 | Asakura | 359/246 |
| 6,984,041 | B2* | 1/2006 | Suzuki et al. | 353/33 |

(Continued)

FOREIGN PATENT DOCUMENTS

EP    1 427 221 A2    6/2004

(Continued)

OTHER PUBLICATIONS

Search Report issued on Dec. 7, 2010, in the counterpart European application, nine pages.

*Primary Examiner* — Georgia Y Epps
*Assistant Examiner* — Magda Cruz
(74) *Attorney, Agent, or Firm* — The Nath Law Group; Jerald L. Meyer; Stanley N. Protigal

(57) ABSTRACT

An optical system attaining a nearly double resolving power in spite of one projector and also eliminating a convergence device is provided. The system includes an 1:1 relay lens in place of a projector lens of a RGB split-combine projection system, and a quarter-wave plate for P-S polarization separation. In operation, once-modulated RGB composite light is divided into a P-polarized light and a S-polarized light by a PS separation wire grid. The S-polarized light is modulated by a luminance signal Y1 at a Y1 device. The P-polarized light is modulated by a luminance signal Y2 at a Y2 device. The lights modulated by the Y1/Y2 devices are combined with each other at a PS composite wire grid to project a synthetic light on a screen.

4 Claims, 8 Drawing Sheets

U.S. PATENT DOCUMENTS

| | | | |
|---|---|---|---|
| 6,985,272 B2 * | 1/2006 | Bridgwater et al. | 359/237 |
| 7,431,460 B2 * | 10/2008 | Hall, Jr. et al. | 353/30 |
| 7,616,266 B2 * | 11/2009 | Tzong et al. | 349/8 |
| 7,686,455 B2 * | 3/2010 | Yoshimura et al. | 353/31 |
| 2003/0067586 A1 * | 4/2003 | Chigira et al. | 353/20 |
| 2003/0103171 A1 * | 6/2003 | Hall et al. | 349/5 |
| 2007/0024811 A1 | 2/2007 | Piehl et al. | |
| 2008/0036970 A1 * | 2/2008 | Hsiung et al. | 353/20 |

FOREIGN PATENT DOCUMENTS

| | | |
|---|---|---|
| WO | 2004/051363 A2 | 6/2004 |
| WO | 2006/038744 A1 | 4/2006 |

* cited by examiner

PROJECTION DISPLAY DEVICE AND OPTICAL SYSTEM MODULATING SEPARATED P-POLARIZED LIGHT AND S-POLARAZED LIGHT

BACKGROUND OF THE INVENTION

1. Field of the Invention

The present disclosure relates to projection display devices and optical systems thereof, and in particular, relates to a projection display device and an optical system thereof both of which can provide high-contrast images for a projection type projector.

2. Description of Related Art

Conventionally, a 3-panel type projector using three pieces (red, green, blue) of modulation devices is general in the projection display device (projector). Depending on the kind of devices, the 3-panel type projectors comprise LCD (Liquid Crystal Display) projector, DLP (Digital Light Processing) projector, LCOS (Liquid Crystal on Silicon) projector and so on.

FIG. 1 is a structural view of a conventional optical system. In FIG. 1, white light is emitted from a specified lamp (e.g. xenon lamp, ultra-high pressure mercury lamp, laser diode, light emission diode, etc.) in a lamp house 11. Then, the white light is changed to a parallel light by a condenser lens 12 and successively reflected by a cold mirror 13 for eliminating UV light or IR light unnecessary for a display device or interposed optical components. Then, the so-reflected light is transmitted through an integrator (rod integrator, flyeye integrator, etc.) 14 and a sequent field lens 15 thereby to enter a B/RG dichroic mirror 16.

The B/RG dichroic mirror 16 resolves incident illumination light to a light containing the wave bands of both red light and green light and a blue light, so that the former light (red and green) enters a RG mirror 17, while the latter light (blue) enters a B mirror 18. In the former light reflected by the RG mirror 17, its red light component is transmitted through a R/G dichroic mirror 19 thereby to enter an R field lens 24, while the green light component is reflected by the R/G dichroic mirror 19 thereby to enter a G field lens 20.

Regarding the green light component transmitted through the G field lens 20 and the red light component transmitted through R field lens 24, their S-polarization components are reflected by wire grids 21, 25 as polarization split elements thereby to enter a G device 23 and an R device 27 through a G quarter-wave (λ/4) plate 22 and an R quarter-wave (λ/4) plate 26, respectively. After light modulation at the G device 23 and the R device 27 with green signal and red signal of an image to be displayed from the 3-primary color signal processing and converting block 1, their P-polarized lights on light modulation are transmitted through the G, R quarter-wave (λ/4) plates 22, 26 and the wire grids 21, 25 thereby to enter an RGB composite dichroic prism 32.

On the other hand, regarding the blue light component reflected by the B mirror 18, it is transmitted through a B field lens 28 and the light's S-polarization component is reflected by a wire grid 29 thereby to enter a B device 31 through a B quarter-wave (λ/4) plate 30. After light modulation at the B device 31 with blue signal of the image to be displayed from the 3-primary color signal processing and converting block 1, the S-polarized light on light modulation is transmitted through the B quarter-wave (λ/4) plate 30 and the wire grid 29 thereby to enter the RGB composite dichroic prism 32.

The RGB composite dichroic prism 32 recombines respective P-polarization components of incident green, red and blue lights on light modulation. The so-combined light is transmitted through a PJ lens 33 to form an image on a screen.

Here, in a projector using the above-mentioned optical system, contrast influencing the definition of images is determined by the performances of the optical system and the individual device. In this view, there are recently proposed a projector and a liquid crystal display that the contrast of images are improved by double modulation dramatically (e.g. Japanese Patent Laid-Open Publication Nos. 2005-181437 and 2005-241738).

FIG. 2 shows the constitution of such an optical system adopting double modulation. In this example, elements identical to those of FIG. 1 are indicated with the same reference numerals respectively and their overlapping descriptions are eliminated. The conventional optical system of FIG. 2 is equivalent to the previously-mentioned optical system of FIG. 1 but the interposition of a Y-modulation system part between the RGB composite dichroic prism 32 and the PJ lens 33, the Y-modulation optical system comprising an aberration correcting lens 34, an 1:1 (one-to-one) relay lens 35, a mirror 36, an aberration correcting lens 37, a Y wire grid (WG) 38, a Y wavelength plate 39, a Y device 40 and a WG analyzer 41. The aberration correcting lenses 34, 37 are formed by cylindrical lenses for correcting aberrations that would be produced since the optical axis is slanted to the Y wire grid (WG) 38 by 45 degrees.

In the conventional optical system of FIG. 2, RGB composite light emitted from the RGB composite dichroic prism 32 is transmitted through the aberration correcting lens 34 and the 1:1 relay lens 35 and subsequently reflected by the mirror 36 for coordinating an optical-axis direction of the 1:1 relay lens 35 with an optical-axis direction of the PJ lens 33. Then, the so-reflected light is transmitted through the aberration correcting lens 37. In the so-transmitted RGB composite light, its P-polarized light is transmitted through the Y wire grid (WG) 38 and the Y wavelength plate 39 thereby to enter the Y device 40.

For instance, the Y device 40 is formed by LCOS (Liquid Crystal on Silicon) to modulate incident light by luminance signal of the same image signal as R-signal, G-signal and B-signal modulated by the R device 27, the G device 23 and the B device 31 respectively. Thus, the image signal to be displayed on a screen (not shown) is subjected to twice modulations, that is, one modulation by 3-primary color (R, G and B) signals and another modulation by the luminance signal. The modulated light from the Y device 40 is transmitted to the Y wire WG 38 through the Y wavelength plate 39 and its S-polarized light is reflected by the Y wire WG 38. Thereafter, P-polarized light component mixed in the S-polarized light is eliminated by the WG analyzer 41 so as to maintain its high-contrast and subsequently projected on the not-shown screen through the PJ lens 33.

According to the general optical system of FIG. 1, as the contrast of an image to be displayed on the screen is influenced by an optical F-number and the performance of the display device, there is no possibility that the image is displayed at a contrast value exceeding the proportion of thousands to one (thousands:1) in a situation of ensuring appropriate brightness. On the contrary, the optical system of FIG. 2 is constructed so as to project an image on a screen (not shown) after once forming an image, which has been brought by the first modulation optical system similar to FIG. 1, on the Y device 40 for a further modulation. Consequently, the contrast of the image displayed on the screen becomes equal to or more than the proportion of a million to one (a million:1) as a result of multiplying a contrast value of the first modulation optical system by a contrast value of the second modulation optical system.

In the projector adopting the optical system of FIG. 2, however, there exists a reality that the resolving power (i.e. number of pixels) of the Y device 40 determines a final resolving power of an image projected on the screen. In even a highest-definition device produced in the market currently, this resolving power would be 4 k×2 k pixels (horizontal: 4,096 pixels, vertical: 2,160 pixels) at the highest.

Under such a situation, there is recently proposed a projector of FIG. 3 in order to attain a higher resolving power (8 k×4 k pixels). This projector is one proposed by Japan Broadcasting Corporation, which is referred to as "Super Hi-Vision (SHV)". Here, the super Hi-Vision is one of a LSDI (Large Screen Digital Imagery) system with 7680×4320 pixels specified in Recommendation ITU-R BT.1769 "parameter values for an expanded hierarchy of LSDI image formats for production and international program exchange". We now describe the operation of this projector with reference to FIG. 3. In the illustrated projector, a hard disk recorder (UDR) 45 capable of parallel-recording/reproducing 16 channels of HDTV images is adapted so as to output a G1G2 image signal and a RB image signal to a convergence correction device 46. In the convergence correction device 46, both convergences of the G1G2 image and the PB image are corrected in order to align their registrations with each other on a screen 49. After the convergence correction, light modulated by the RB image is projected by a RB projector 47, while light modulated by the G1G2 image is projected by a GG projector 48, forming an image on the screen 49.

In order to attain the resolving power of 8 k×4 k pixels, the G1G2 projector 48 utilizes two G devices (G1 device and G2 device) each having 4 k×2 k pixels. In common with the G1 and G2 devices, respective pixels are arranged at intervals of pitch Px in the horizontal direction and pitch Py in the vertical direction. As shown in FIG. 4, respective pixels forming the whole G1 device are shifted from respective pixels forming the whole G2 device by Px/2 in the horizontal direction and by Py/2 in the vertical direction. That is, while inputting signals meeting with the resolving power of G1G2 to the GG projector 28, respective images from the G1 and G2 devices are overlaid on each other at a slant of 45 degrees by half pixel, whereby the resolving power equivalent to 8 k pixels is attained. On the other hand, the RB projector 47 utilizes an R device and a B device each having 4 k×2 k pixels.

That is, it is difficult structurally to fabricate an optical system where 2 channels of green images are provided by a single projector. Therefore, the proposed projector of FIG. 3 adopts the shown constitution composed of the GG projector 48 for G1, G2 and the RB projector 47 as a result of eliminating a G-component from the RGB projector. In this projector, by projecting images from two projectors 47, 48 in stack and further combining respective images with each other onto the screen 49, a high resolving power (high-definition) can be attained.

SUMMARY OF THE INVENTION

In the conventional optical system and projection display device of FIG. 3, however, it is complicated to adjust in aligning two images projected from the projectors 47, 48 with each other.

In addition, due to the difference in position between the G1G2 projector 48 and the RB projector 47, the image composition on the screen 49 causes the circumferential registration of projected images to collapse greatly, especially on a curve screen. This is why the above convergence correction device 46 is required to offset the RB signal digitally thereby to superimpose it on a G1G2 projected position. The convergence correction method comprises the following steps of: first projecting a special pattern on the screen; taking a picture of the pattern projected on the screen by a digital camera and calculating a shift length of the projected pattern; correcting an image by the shift length; secondly taking a picture of the corrected image by the digital camera; and repeating the correction again and again thereby to ensure a correction value. In this way, the above-constructed convergence correction device 46 is an indispensable presence for the conventional optical system and projection display device of FIG. 3, causing the whole system to be expensive.

Under the above-mentioned problems, an object of the present invention is to provide a double-modulation optical system which can provide an image at nearly-double contrast in spite of a single projector and eliminate the use of such a convergence device whereby the reduction in manufacturing cost and the contrast can be improved. Another of object of the present invention is to provide a projection display device adopting such a double-modulation optical system.

In order to achieve the above objects, there is provided an optical system comprising: a modulation optical system for combining respective modulated primary color lights with each other in wavelength thereby to produce and output a first composite light, the respective modulated primary color lights being provided by modulating 3-primary color lights by 3-primary color signals produced from an image signal individually, a separator for dividing the first composite light into a P-polarized light and a S-polarized light; a first modulation light generator for modulating the S-polarized light by one of two kinds of luminance signals produced from the image signal thereby to produce a first modulation light; a second modulation light generator for modulating the P-polarized light by the other of the luminance signals produced from the image signal thereby to produce a second modulation light; a photosynthesizer for combining the first modulation light with the second modulation light thereby to produce a second composite light; and a projector for projecting the second composite light.

In order to achieve the above objects, there is also provided a projection display device comprising, using first and second primary color signals both composed of a plurality of primary color light components related to an image to be displayed, the device comprising: a first signal generator for generating a first band-unlimited luminance signal based on the first primary color signal and a second band-unlimited luminance signal based on the second primary color signal; a second signal generator for band-limiting the first and second primary color signals thereby to calculate a maximum of each of the first and second band-limited primary color signals with respect to each pixel and generating third and fourth band-limited luminance signals based on each of the first and second band-limited primary color signals; a third signal generator for generating: color-signal correcting coefficients based on the maximum of the each of the first and second band-limited primary color signals with respect to each pixel, the maximum obtained by the second signal generating means, a first display luminance signal based on the maximum of the each of the first and second band-limited primary color signals with respect to each pixel and the first and third luminance signals, and a second display luminance signal based on the maximum of the each of the first and second band-limited primary color signals with respect to each pixel and the second and fourth luminance signals; a fourth signal generator for multiplying the color-signal correcting coefficients by the first and second band-limited primary color signals thereby to generate 3-primary color display signals; a modulation optical system that wavelength-combines respective modulation primary color signals obtained by modulating the 3-primary color display signals with respect to each primary color thereby to produce and output a first composite light; a separator for dividing the first composite light into a P-polarized light and a S-polarized light; a first modulation light generator for modulating the S-polarized light by the first display luminance signal thereby to produce a first modulation light; a second modulation light generator for modulating the P-polarized light by the second display luminance signal thereby to produce a second modulation light; a photosynthesizer for combining the first modulation light with the second modulation light thereby to produce a second composite light; and a projector for projecting the second composite light.

DETAILED DESCRIPTION OF THE PREFERRED EMBODIMENT

Embodiments of the present invention will be described with reference to drawings.

Figure 1:
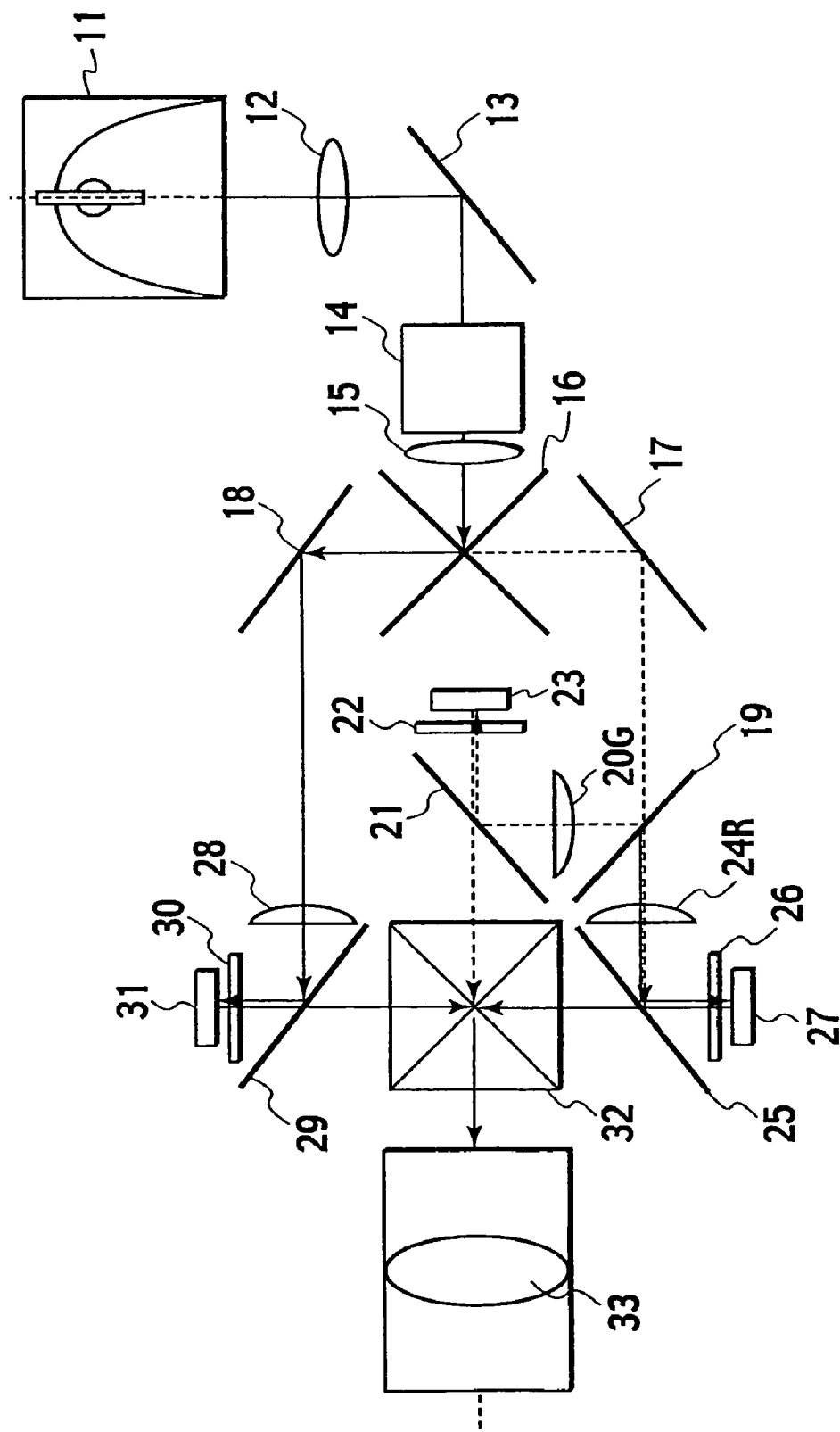
FIG. 1 is a structural view of a conventional optical system.
Figure 2:
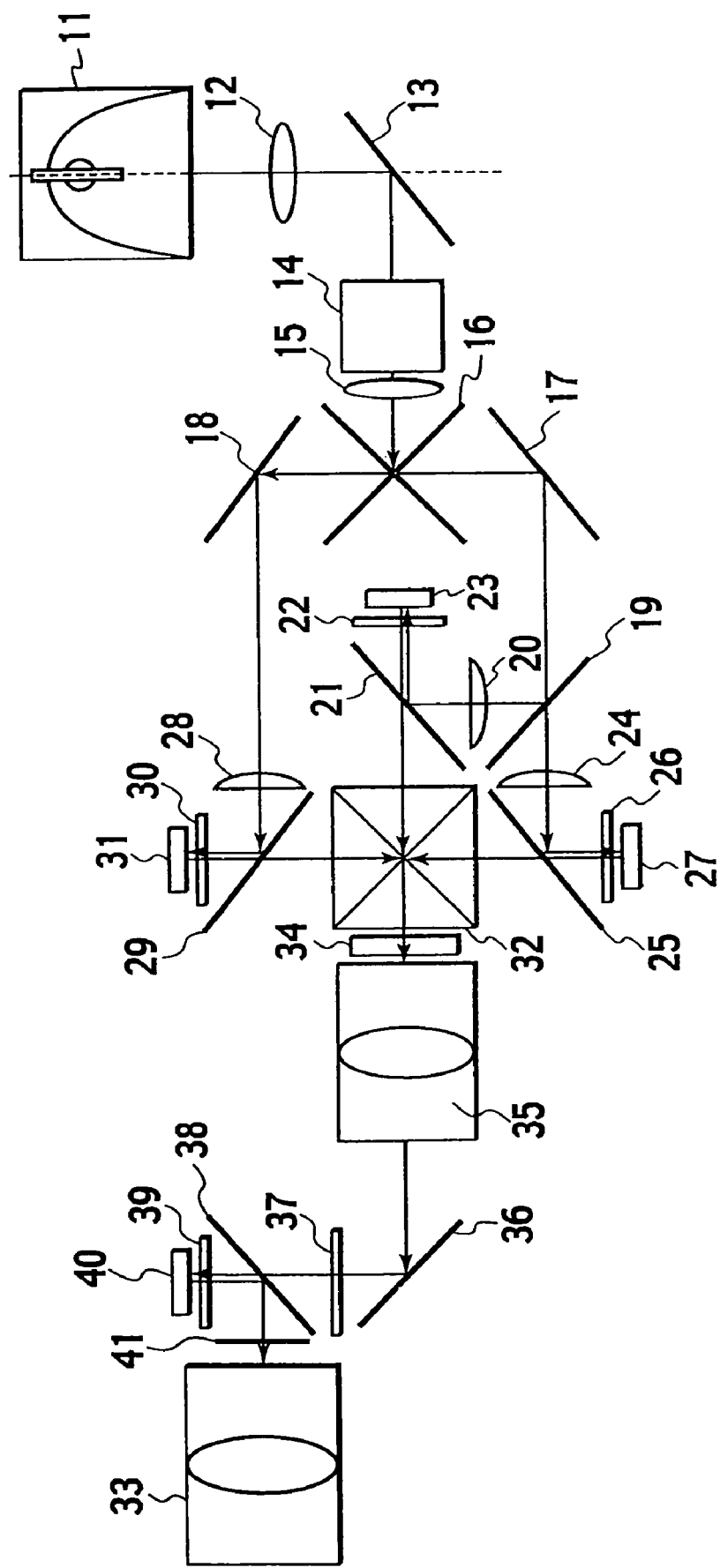
FIG. 2 is a structural view of another conventional optical system applying a double-modulation to signals.
Figure 5:
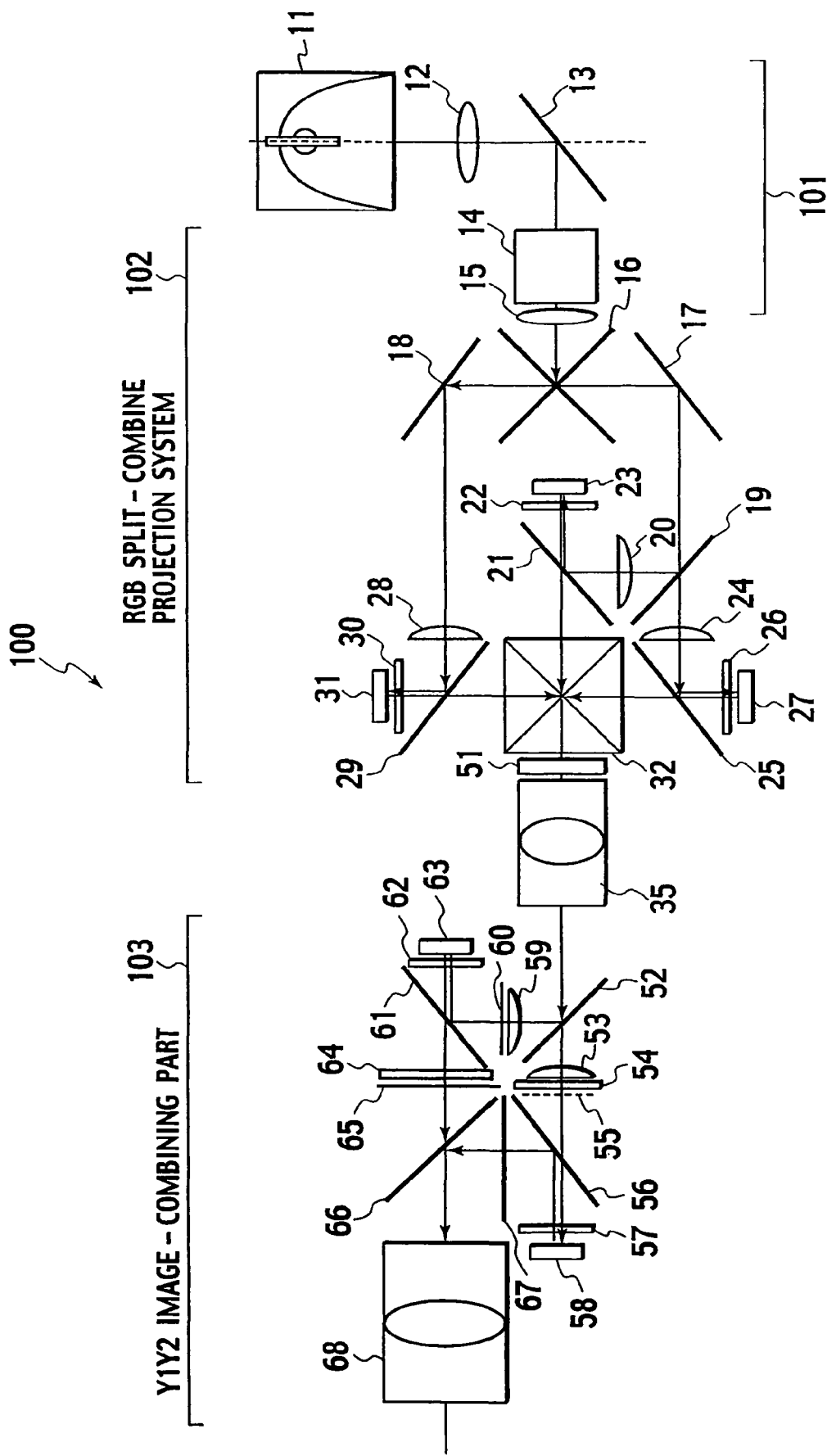
FIG. 5 is a structural view of an optical system in accordance with an embodiment of the present invention.

FIG. 5 is a structural view of an optical system in accordance with an embodiment of the present invention. In FIG. 5, elements identical to those of FIG. 2 are indicated with the same reference numerals respectively, and their descriptions are eliminated. As shown in FIG. 5, the optical system 100 of this embodiment comprises an optical illumination system part 101, a RGB split-combine projection system 102, a quarter-wave plate 51, an 1:1 (one-to-one) relay lens 35, a Y1Y2 image-combining part 103 and a Y1Y2 projector lens 68. In the optical system 100, its part composed of the optical illumination system part 101, the RGB split-combine projection system 102 and the 1:1 relay lens 35 is identical to a part of FIG. 2 from the lamp house 11 to the 1:1 relay lens 35. The optical system 100 of this embodiment is provided by interposing the quarter-wave plate 51 for PS separation in a subsequent stage between the RGB composite dichroic prism 32 and the 1:1 relay lens 35 and further adding the Y1Y2 image-combining part 103 and the Y1Y2 projector lens 68 on the emission side of the 1:1 relay lens 35.

The Y1Y2 image-combining part 103 comprises a PS separation WG (wire grid) generator 52 for dividing incident light into a P-polarized light and a S-polarized light, a Y2 field lens 53, a Y2 aberration correcting lens 54, an analyzer 55, a Y2 WG 56 (mentioned later, in detail), a Y2 wavelength plate 57 as a retarder corresponding to the characteristic of a later-mentioned device, a Y2 second modulation light generator device 58 for modulating the incident light by a Y2 signal, a Y1 field lens 59, an analyzer 60 for removing a p-polarized light, a Y1 WG 61 (mentioned later, in detail), a Y1 wavelength plate 62 as another retarder corresponding to the characteristic of a later mentioned device, a Y1 first modulation light generator device 63 for modulating the incident light by a Y1 signal, a Y1 aberration correcting lens 64, a Y1 analyzer 65, a PS composite WG 66 and a Y2 analyzer 67. In these components, the PS separation WG 52 is formed by a wire grid (WG) type polarization split element (e.g. product named "Moxtek"). The Y2 WG photosynthesizer 56 is adapted so as to allow the P-polarized light passing through the PS separation WG 52 to be transmitted therethrough and also adapted so as to reflect a S-polarized light as a resulting of modulating the P-polarized light by the Y2 device 58. On the contrary, the Y1 WG 61 is adapted so as to reflect the S-polarized light reflected by the PS separation WG 52 and also adapted so as to allow a P-polarized light, which has been produced as a resulting of modulating the S-polarized light by the Y1 device 63, to be transmitted through the Y1 WG 61.

Figure 3:
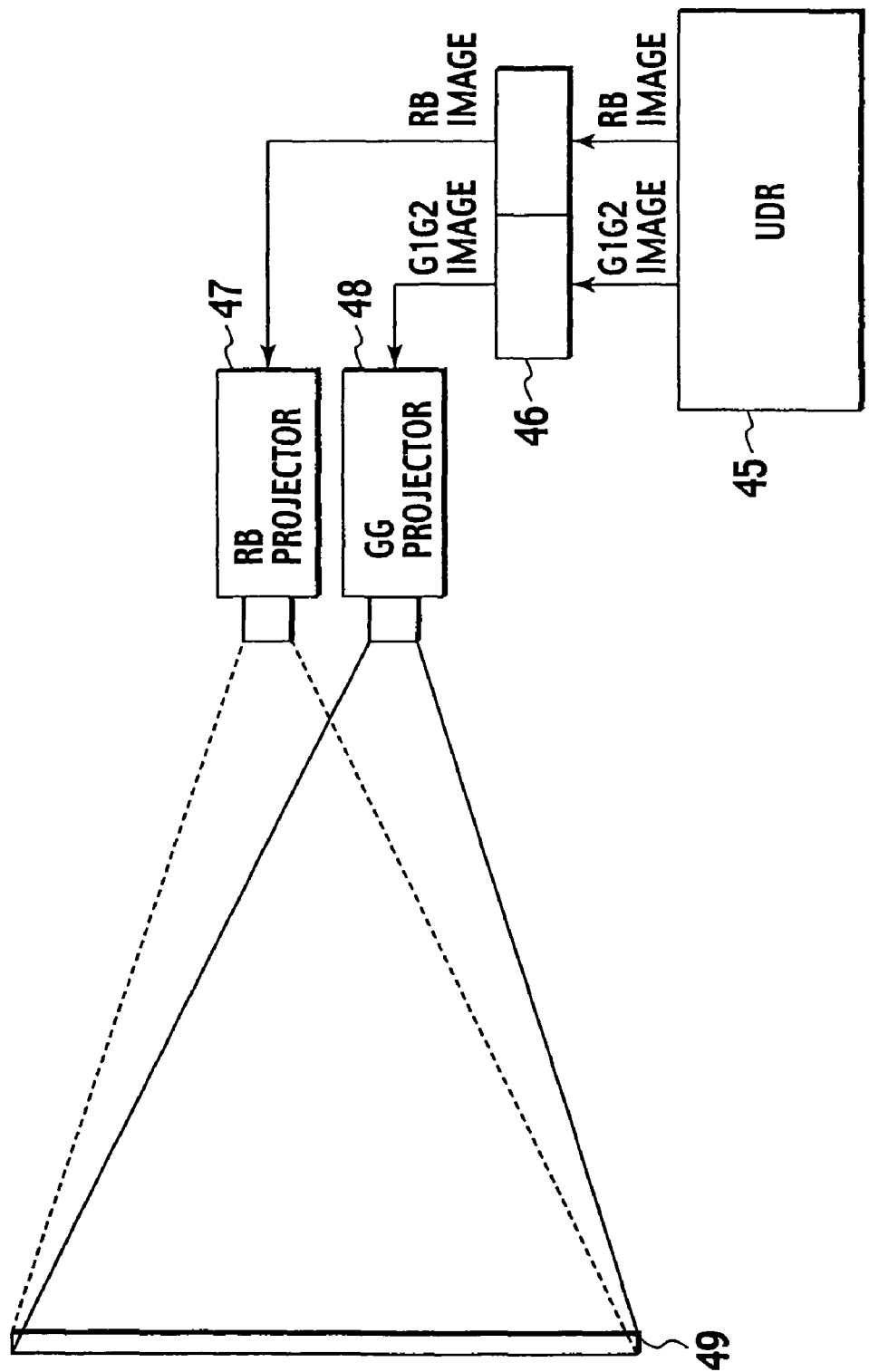
FIG. 3 is a block diagram of an optical system and a projection display device in prior art.

In this embodiment, the Y2 device 58 and the Y1 device 63 are together formed by LCOS (Liquid Crystal on Silicon, that is, reflection type liquid crystal panel) with e.g. 4,096 pixels in the horizontal direction and 2,160 pixels in the vertical direction. These devices are spatially arranged so as to be shifted from each other at a slant of 45 degrees by half pixel, as previously mentioned with reference to FIG. 4. In the conventional optical system and projection display device of FIG. 3, the G1 device and the G2 device are shifted from each other at a slant of 45 degrees by half pixel. On the contrary, according to the embodiment, as such an arrangement (i.e. shifting at a slant of 45 degrees by half pixel) is directed to the Y1 device 63 and the Y2 device 58 that commonly modulate the lights by luminance signals, high-definition images are expected in comparison with those of the conventional optical system and projection display device.

Besides, the Y1 analyzer 65 is inclined to a lens optical axis by approx. 10 degrees so that a reflection light therefrom does not return to the Y1 device 63. Similarly, the Y2 analyzer 67 is also inclined to a lens optical axis by approx. 10 degrees so that a reflection light therefrom does not return to the Y2 device 58.

Next, the operation of this embodiment will be described below. The composite light (P-polarized light) consisting of RGB primary color lights first modulated and emitted from the RGB composite dichroic prism 32 is λ/4-turned to be a composite light consisting of P-polarized light and S-polarized light by the quarter-wave plate 51. Successively, the resultant composite light is transmitted through the 1:1 relay lens 35 and further divided into a P-polarized light and a S-polarized light by the PS separation WG 52.

The S-polarized light through the PS separation WG 52 is transmitted through the Y2 field lens 53 for collecting lights from the 1:1 relay lens 35 toward an element. Continuously, after correcting the light's focus deterioration (particularly, astigmatism) originating in the passage through the PS separation WG 52 and the Y2 WG 56 by the Y2 aberration correcting lens 54, a S-polarized light component is removed from the corrected P-polarized light by the analyzer 55. It is noted that there is a possibility that when the P-polarized light passes through the Y2 field lens 53 and the Y2 aberration lens 54, the light's polarization is disrupted. For this reason, the analyzer 55 is provided to eliminate the S-polarized light component thereby to enhance its optical quenching ratio. For example, the analyzer 55 is formed by WG (wire grid). However, the analyzer 55 may be eliminated unless the contrast is influenced by the Y2 device 58.

The P-polarized light from the analyzer 55 is transmitted through the Y2 WG 56 and the Y2 wavelength plate 57 and further subjected, at the Y2 device 58, to a second modulation using a luminance signal Y2. Then, modulated light where P-polarized light and S-polarized light are mixed is emitted from the Y2 device 58 and transmitted through the Y2 wavelength plate 57. In the modulated light, then, its S-polarized light is reflected by the Y2 WG 56 and successively, its P-polarized light component is removed by the Y2 analyzer 67 thereby to enter the PS composite WG 66. Here, since the S-polarized light reflected by the Y2 WG 56 is accompanied with a slight P-polarized light component due to the backside reflection of the Y2 WG 56, the Y2 analyzer 67 is provided to remove such a P-polarized light component from the S-polarized light.

On the other hand, the S-polarized light reflected by the PS separation WG 52 is transmitted through the Y1 field lens 59 and successively, its P-polarized light component is removed by the analyzer 60. Here, since the S-polarized light reflected by the PS separation WG 52 is mixed with a slight P-polarized light component due to the backside reflection of the PS separation WG 52, the analyzer 60 is provided to remove such a P-polarized light component from the S-polarized light. Then, the S-polarized light emitted from the analyzer 60 is reflected by the Y1 WG 61 and subsequently transmitted through the Y1 wavelength plate 62 thereby to enter the Y1 device 63 performing a second modulation using a luminance signal Y1.

Modulated light where P-polarized light and S-polarized light are mixed is emitted from the Y1 device 63 and transmitted through the Y1 wavelength plate 62. Further, its P-polarized light is transmitted to the PS composite WG 66 through the Y1 WG 61, the Y1 aberration correcting lens 64 and the Y1 analyzer 65, in this order. In general, an aberration correcting lens is provided to correct for aberration produced since light enters a glass substrate obliquely to the direction of its thickness at a certain degree. That is, in this case, the Y1 aberration correcting lens 64 corrects for aberrations that might be produced since the P-polarized light enters the Y1 WG 61 and the PS composite WG 66 obliquely at an angle of 45 degrees. While, the Y1 analyzer 65 allows the S-polarized light to be incident on the PS composite WG 66 on condition that S-polarized light component mixed therein is removed from the P-polarized light previously. The PS composite WG 66 combines the P-polarized light from the Y1 analyzer 65 with the S-polarized light from the Y2 analyzer 67, allowing the resultant composite light to be projected on the screen (not shown) through the Y1Y2 projector lens 68.

In this way, according to the above-mentioned embodiment, there is no need of providing a convergence correction device 46 (see FIG. 3) to correct a misalignment between a RB image and a GG image and additionally, a composite image by two projectors in Super Hi-Vision can be obtained by a single projector. It is therefore possible to reduce the manufacturing cost of the optical system remarkably and also possible to facilitate adjustment in installing the optical system. In addition, as the modulations are carried while dividing the identical luminance signal into Y1 and Y2, there exists a Y composite image obtained by combining both of images as a result of offsetting 4 k×2 k pixels diagonally, realizing hi-definition in comparison with the conventional optical system. Moreover, as the double modulation of this embodiment allows the contrast of images to be improved remarkably, an ultrahigh-contrast image (more than a proportion of 1,000,000 to 1) having 8 k×4 k pixels (SHV) can be provided by a single optical system.

Figure 6:
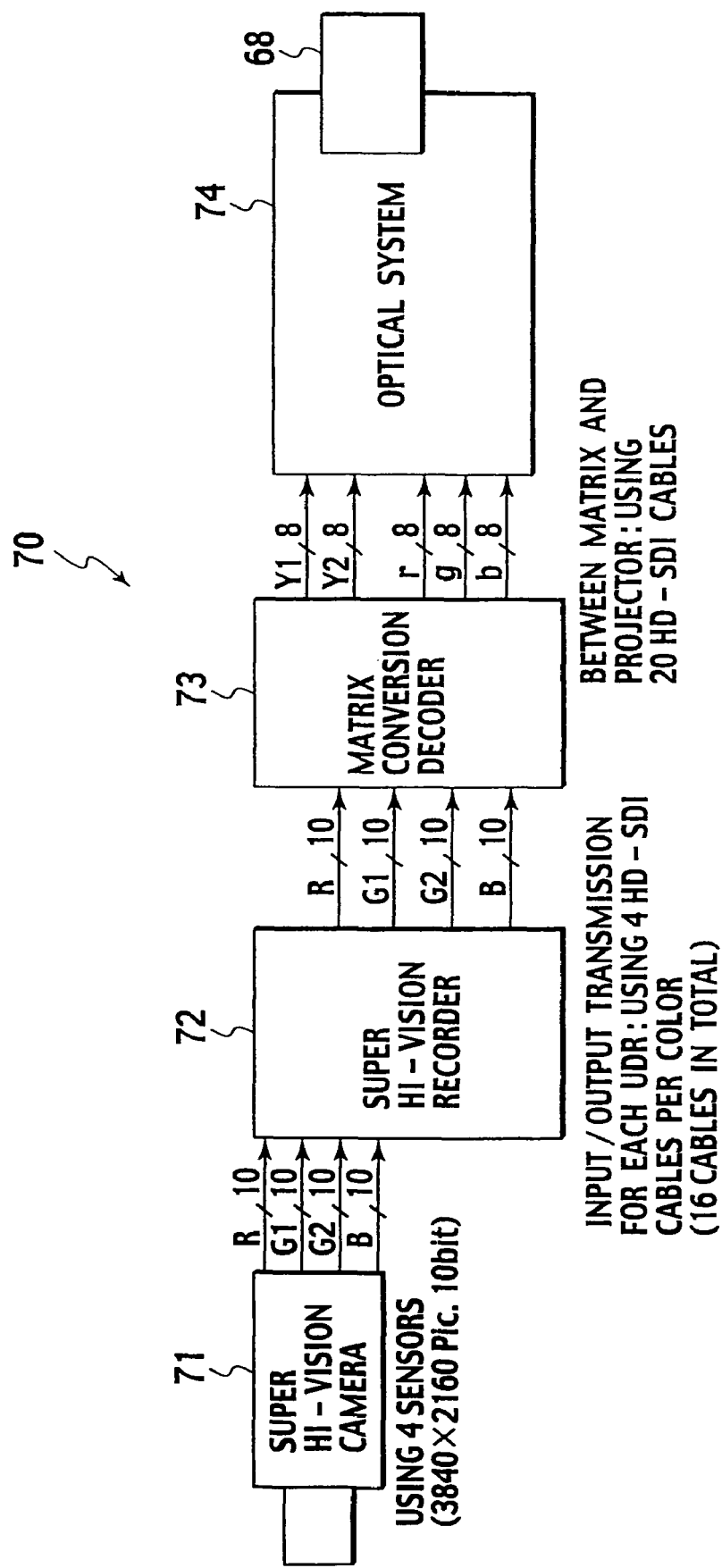
FIG. 6 is a structural view of a projection display device in accordance with an embodiment of the present invention.

Next, a projection display device will be described below. FIG. 6 is a systematic block diagram of the projection display device in accordance with one embodiment. In FIG. 6, the projection display device 70 comprises a Super Hi-Vision camera first to fourth image pickup devices 71 for taking a picture of a desired object, a Super Hi-Vision recorder 72 for recording and reproducing imaging signals of the Super Hi-Vision camera 71, a matrix conversion decoder 73 that inputs green signals G1 and G2, a red signal R and a blue signal B from the recorder 72 and outputs two kinds of luminance signals Y1, Y2 and color signals "r", "g" and "b" as a result of matrix conversion of the above input signals and an optical system 74 for projecting an optical image on a not-shown screen. Besides, primary color lights produced from a computer image, a film image, etc. may be used in place of the Super Hi-Vision camera 71 of FIG. 6.

Having four pieces of solid-state image sensing devices (two for green light; one for red light; and one for blue light), the Super Hi-Vision camera 71 is adapted so that each solid-state image sensing device outputs primary color signals of 10 bits at a frame rate of 60 p (vertical frequency: 60 Hz). The output signals are transmitted by means of HD-SDI (high-definition serial digital interface) used in broadcast stations currently. Four cables are used with respect to each signal, bringing the total to sixteen channels. Depending on the camera's character, the output signals are transmitted with the use of a single optical fiber.

The Super Hi-Vision recorder 72 has input primary color signals of 16 channels recorded in sixteen hard disks simultaneously and incompressively. The Super Hi-Vision camera 71 and the Super Hi-Vision recorder 72 are identical to a Super Hi-Vision camera and a Super Hi-Vision recorder both used in the conventional Super Hi-Vision (SHV) system, respectively.

Figure 4:
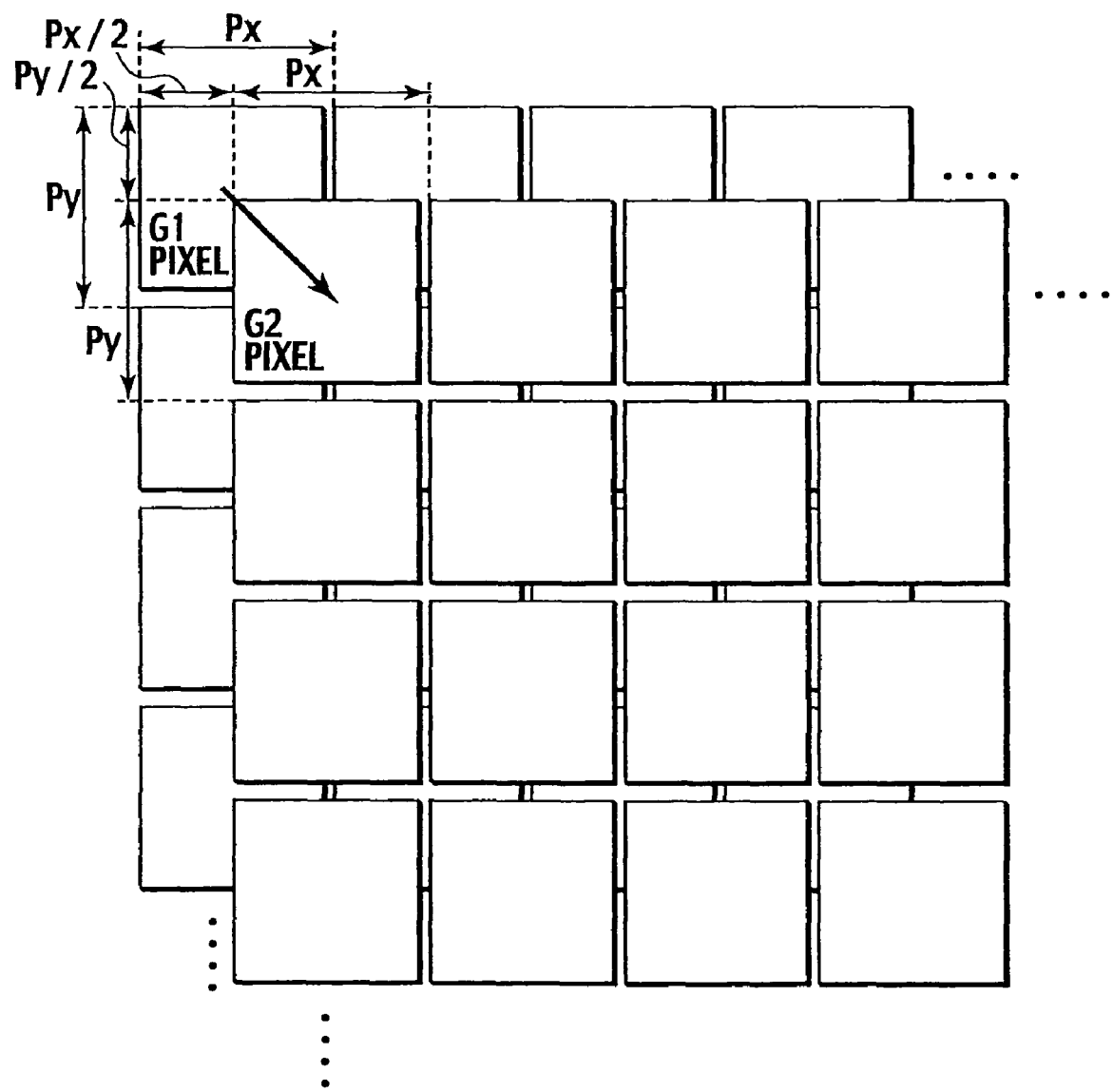
FIG. 4 is a view explaining the structure of shifting respective pixels of from each other at a slant of 45 degrees by half pixel.

In the SHV system, for example, the Super Hi-Vision camera 71 has four solid-state image sensing devices (two for green light; one for red light; and one for blue light) each having 3,840 pixels in the horizontal direction and 2,160 pixels in the vertical direction (i.e. 4 k pixels), which are installed in a "Philips" type prism. In these solid-state image sensing devices, respective pixels for two "green" solid-state image sensing devices are shifted from each other at a slant of 45 degrees by half pixel, as shown in FIG. 4. With the above-mentioned arrangement of the "green" solid-state image sensing devices, the Super Hi-Vision camera 71 is adapted so as to receive light where green light is divided into halves and output signals G1 and G2, realizing a equivalent resolving power of 7,680 pixels in the horizontal direction and 4,320 pixels in the vertical direction, which is twice as high as the resolving power of 3,840 pixels in the horizontal direction and 2,160 pixels in the vertical direction.

The reason why the Super Hi-Vision camera 71 is provided with two "green" solid-state image sensing devices is that human's eyes have the highest relative luminous efficiency for green light in comparison with the other relative luminous efficiency for red or blue light. That is, by enhancing the resolving power of the solid-state image sensing device for green light, the improvement of apparent resolving power is accomplished. In this embodiment, since the green light is picked up in two channels, both of the signal recording/reproducing system and the transmission system have to be constructed so as to process signals by four channels in total. In this view, a projector in the SHV system has to be provided with an optical arrangement where respective pixels of the G1, G2 devices are shifted from each other at a slant of 45 degrees by half pixel.

The feature of this embodiment resides in that the present optical system of FIG. 5 is supplied with two luminance signals Y1, Y2 and three color signals "r", "g" and "b", which are obtained by the matrix conversion decoder 73 converting four primary color signals (R, G1, G2 and B) outputted from the Super Hi-Vision recorder 72.

Figure 7:
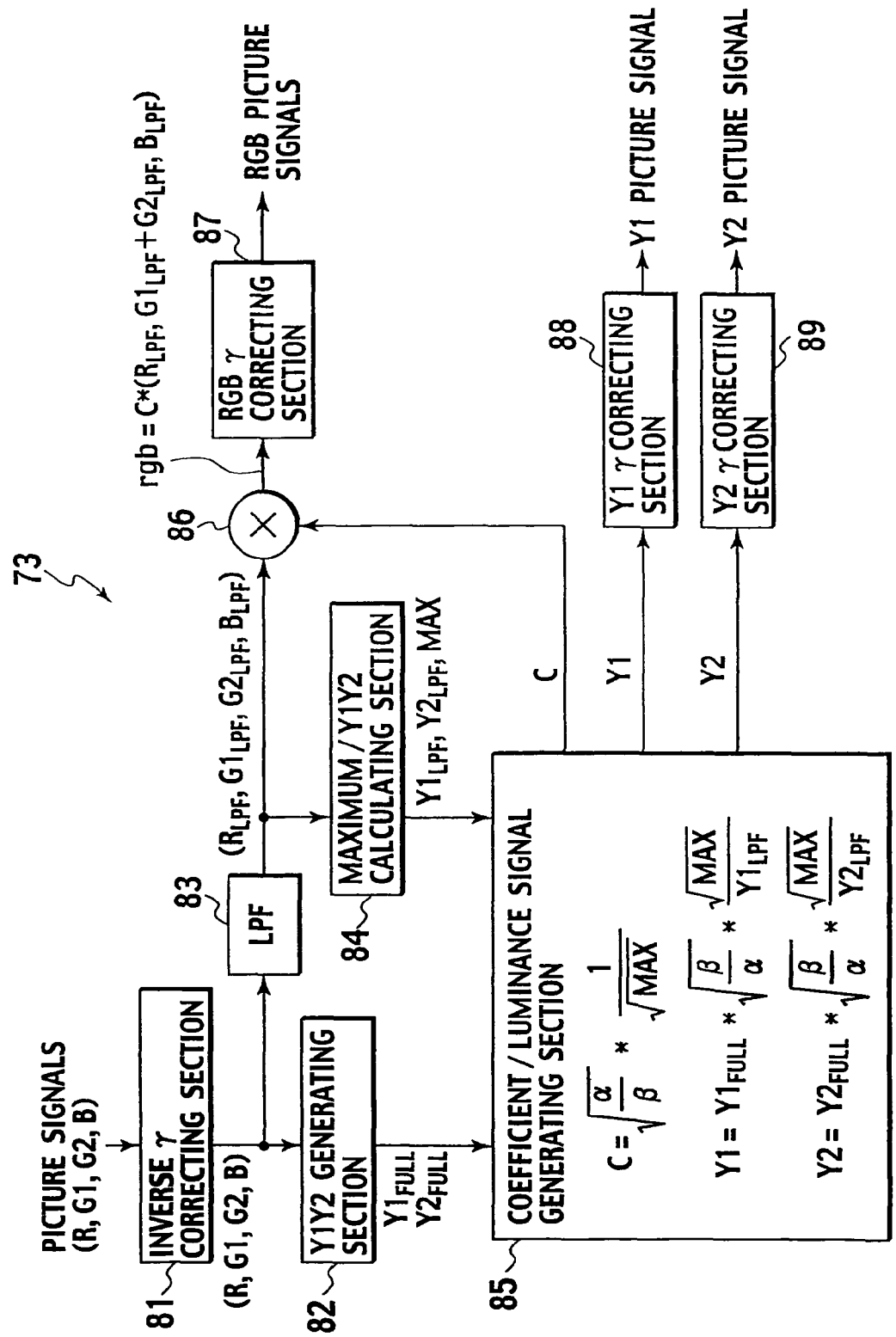
FIG. 7 is a block diagram showing an example of a matrix conversion decoder of FIG. 6.

FIG. 7 is a block diagram of the matrix conversion decoder 73. First of all, the matrix conversion decoder 73 inputs four primary color signals (i.e. a red signal R, a first green signal G1, a second green signal G2 and a blue signal B) from the Super Hi-Vision recorder 72. In the matrix conversion decoder 73, an inverse gamma (γ) correcting section 81 once applies an inverse gamma (γ) correction to the input primary color signals thereby to bring them back to γ1-linear signals for facilitating an internal calculation. Subsequently, with a known matrix calculation method, a Y1Y2 generating section first signal generator 82 drafts a first luminance signal Y1FULL in a frequency band (band-unlimited) by the 3-primary color signals R, G1 and B and a second luminance signal Y2FULL in a frequency band (band-unlimited) by the 3-primary color signals R, G2 and B.

In the matrix conversion decoder 73, additionally, a lowpass filter (PLF) 83 attenuates respective high-frequency components of four primary color signals from the inverse gamma (γ) correcting section 81 thereby to pick up 4-primary color signals RLPF, G1 LPF, G2 LPF and BLPF of low-frequency components and successively send these pickup signals to both a maximum/Y1Y2 calculating section 84 and a multiplier 86. Then, the maximum/Y1Y2 calculating section 84 calculates a maximum MAX of the "band-limited" 4-primary color signals RLPF, G1LPF, G2LPF and BLPF with respect to each pixel. Further, with a known matrix calcualation method, the maximum/Y1Y2 calculating section 84 calculates a low-frequency component Y1LPF of the first luminance signal by the "band-limited" first 3-primary color signals RLPF, G1LPF and BLPF and a low-frequency component Y2 LPF of the second luminance signal by the "band-limited" second 3-primary color signals RLPF, G2 LPF and BLPF. Here the lowpass filter 83 and the maximum/Y1Y2 calculating section 84 are collectively referred as "second signal generator".

In the matrix conversion decoder 73, a coefficient/luminance signal generating section third signal generator 85 inputs the luminance signals Y1FULL and Y2FULL from the Y1Y2 generating section 82, the maximum MAX from the maximum/Y1Y2 calculating section 84 and the low-frequency components Y1LPF, Y2LPF of the luminance signals from the same section 84. Then, the coefficient/luminance signal generating section 85 calculates a coefficient C and the luminance signals Y1, Y2 by the following computing equations.

$$C = (\alpha/\beta)^{1/2} \cdot (MAX)^{-1/2} \quad (1)$$

$$Y1 = Y1_{FULL} \cdot (\beta/\alpha)^{1/2} \cdot (MAX)^{1/2} / Y1_{LPF} \quad (2)$$

$$Y2 = Y2_{FULL} \cdot (\beta/\alpha)^{1/2} \cdot (MAX)^{1/2} / Y2_{LPF} \quad (3)$$

Here, we now explain the above computing equations for C, Y1 and Y2 in detail. It is noted that input image signals supplied to the matrix conversion decoder 73 comprise four primary color signals (R, G1, G2, B) outputted from the Super Hi-Vision recorder 72. Three optical outputs $F_{1R}$, $F_{1G}$ and $F_{1B}$ corresponding to the image signals R, G1, G2 and B can be represented by the following equations, respectively.

$$F_{1R} = F_1(r) = A \cdot r + \alpha \quad (4a)$$

$$F_{1G} = F_1(g) = A \cdot (g1 + g2) + \alpha \quad (4b)$$

$$F_{1B} = F_1(b) = A \cdot b + \alpha \quad (4c)$$

In the above equations (4a) to (4c), "α" represents a flare component of light in case of projecting the signals outputted from the Super Hi-Vision recorder 72. Further, "A" denotes a proportionality constant. Alphabets "r", "g1", "g2" and "b" represent respective signals of the primary color signals R, G1, G2 and B on condition of γ=1.0.

As these optical outputs $F_{1R}$, $F_{1G}$ and $F_{1B}$ are further modulated by the Y1Y2 image-combining part 103 of FIG. 5 respectively, RGB components $F_{2R}$, $F_{2G}$ and $F_{2B}$ of final optical inputs can be represented by the following equations, respectively.

$$F_{2R} = F_1(r) \cdot (A \cdot Y + \beta) \quad (5a)$$
$$= A^2 \cdot Y \cdot r + A \cdot Y \cdot \alpha + A \cdot r \cdot \beta + \alpha \cdot \beta$$

$$F_{2G} = F_1(g) \cdot (A \cdot Y + \beta) \quad (5b)$$
$$= A^2 \cdot Y \cdot (g1 + g2) + A \cdot Y \cdot \alpha + A \cdot (g1 + g2) \cdot \beta + \alpha \cdot \beta$$

$$F_{2B} = F_1(b) \cdot (A \cdot Y + \beta) \quad (5c)$$
$$= A^2 \cdot Y \cdot b + A \cdot Y \cdot \alpha + A \cdot b \cdot \beta + \alpha \cdot \beta$$

In the above equations (5a) to (5c), "β" represents a flare component of light outputted from the Y1Y2 image-combining part 103. Further, "Y", represents respective luminance signals of the luminance signals Y1, Y2 on condition of γ=1.0. In the following description, for convenience, the luminance signals Y1, Y2 will be referred to as "Y" collectively.

Meanwhile, in case of a general 3-panel type projector, the final outputs $F_{2R}$, $F_{2G}$ and $F_{2B}$ are proportional to input image signals, respectively. However, if flares are present or the number of pixels of each device in the RGB split-combine projection system 102 is different from the number of pixels of each device in the Y1Y2 image-combining part 103, the final outputs $F_{2R}$, $F_{2G}$ and $F_{2B}$ are not necessarily proportional to input image signals. Now, for ease of explanation, it is assumed that the number of pixels of each device in the RGB split-combine projection system 102 is smaller than the number of pixels of each device in the Y1Y2 image-combining part 103. Then, the image signals "r", "g1", "g2" and "b" have no frequency component higher than those of the input image signals R, G1, G2 and B, respectively.

By allowing the input image signals R, G1, G2 and B to be transmitted through the LPF 83, therefore, we hereby consider low-frequency components $R_{LPF}$, $G1_{LPF}$, $G2_{LPF}$ and $B_{LPF}$ of primary color signals whose frequency characteristic are identical to those of the image signals "r", "g1", "g2" and "b". Further, we define a maximum of these low-frequency components $R_{LPF}$, $G1_{LPF}$, $G2_{LPF}$ and $B_{LPF}$ as "MAX" (value: different for every pixel). Using the values of MAX, $R_{LPF}$, $G1_{LPF}$, $G2_{LPF}$ and $B_{LPF}$ can be represented by the following equations. In the following equation, each value of "r", "g1", "g2" and "b" are equal to or more 0 than and less than 1.0 (i.e. 0≦r1, g1, g2, b1<1.0). Note that $G_{LPF}$ represents an additional value $G1_{LPF}$ and $G2_{LPF}$.

$$R_{LPF} = MAX \cdot r1 \quad (6a)$$

$$G_{LPF} = G1_{LPF} + G2_{LPF} \quad (6b)$$
$$= MAX \cdot g1 + MAX \cdot g2$$
$$= MAX \cdot (g1 + g2)$$

$$B_{LPF} = MAX \cdot b1 \quad (6c)$$

For ease of explanation, assume the proportionality constant A is equal to 1, hereinafter. Further, if $R_{LPF}$ is identical to MAX (i.e. r1=1), then $F_{2R}$ will be represented by the next equation since the values of α and β are negligible because of their smallness.

$$F_{2R} \approx Y \cdot r + Y \cdot \alpha + r \cdot \beta \qquad (7)$$

From the above equation, there are calculated Y and "r" for minimizing the flare component. In case of no flare component (α=β=0), the next equation will be obtained by the equations (6a), (7) because of the relationship of $F_{2R}=R_{LPF}$.

$$F_{2R} \approx Y \cdot r = \text{MAX} \qquad (8)$$

In the above equation (7), a condition to minimize the influence of flare is represented by the following equation.

$$Y \cdot \alpha = r \cdot \beta \qquad (9)$$

Thus, the equations (10), (11) are obtained by the equations (8), (9).

$$r = (\alpha/\beta)^{1/2} \cdot (\text{MAX})^{1/2} \qquad (10)$$

$$Y = (\beta/\alpha)^{1/2} \cdot (\text{MAX})^{1/2} \qquad (11)$$

Next, the green signal g will be described. As "Y" has already been obtained, when establishing $F_{2G}$ equal to $G_{LPF}$ to neglect α and β, the next equation is obtained by the equations (5b), (6b).

$$F_{2G} \approx Y \cdot (g1 + g2) \qquad (12)$$
$$= G_{LPF}$$
$$= (g1 + g2) \cdot \text{MAX}$$

Thus, from the equations (11), (12), the green signal "g" is represented by the following equation.

$$g = \{(g1 + g2)/Y\} \cdot \text{MAX} \qquad (13)$$
$$= (g1 + g2) \cdot (\beta/\alpha)^{1/2} \cdot (\text{MAX})^{1/2}$$

As well, it is also possible to obtain the blue signal "b".

In the above calculations, explanations are based on the premise that the low-frequency component $R_{LPF}$ of the red signal is MAX. However, the following equations could be established even if any one of $R_{LPF}$, $G_{LPF}$ and $B_{LPF}$ is regarded as MAX.

$$r = r1 \cdot (\beta/\alpha)^{1/2} \cdot (\text{MAX})^{1/2} \qquad (14a)$$

$$g = (g1+g2) \cdot (\beta/\alpha)^{1/2} \cdot (\text{MAX})^{1/2} \qquad (14b)$$

$$b = b1 \cdot (\beta/\alpha)^{1/2} \cdot (\text{MAX})^{1/2} \qquad (14c)$$

Using the 4-primary color signals $R_{LPF}$, $G1_{LPF}$, $G2_{LPF}$ and $B_{LPF}$ of low-frequency components from the LPF 83 and the correction coefficient C from the coefficient/luminance signal generating section 85, the multiplier 86 generates the red signal "r", the green signal "g" and the blue signal "b" each having 8 bits by the following computing equations.

$$r = C \cdot R_{LPF} \qquad (15a)$$

$$g = C \cdot (G1_{LPF} + G2_{LPF}) \qquad (15b)$$

$$b = C \cdot B_{LPF} \qquad (15c)$$

Here, by the equations (6a)-(6c), (14a)-(14c) and (15a)-(15c), the correction coefficient C generated by the coefficient/luminance signal generating section 85 is represented by the above-mentioned equation (1). These signals "r", "g" and "b" are supplied to an RGB gamma (γ) correcting section 87 for their gamma (γ) correction and thereafter, the so-corrected signals are supplied to the R device 27, the G device 23 and the B device 31 of FIG. 5, respectively. The multiplier 86 and the RGB gamma correcting section 87 are collectively referred as "fourth signal generator".

Although the equations (15a) to (15c) are based on the presupposition of no high-frequency component, it should be noted that there are high-frequency components actually. Accordingly, the generation of luminance signals by means of the signals "r", "g" and "b" in the equations (15a) to (15c) would cause respective high-frequency components to be lost. In addition, regarding the luminance signal Y, it is necessary to generate the luminance signals Y1, Y2 to be supplied to the Y1 device 63 and the Y2 device 58. Considering such a situation, as previously mentioned about the Y1Y2 generating section 82 of FIG. 7, it is carried out to produce a first luminance signal $Y1_{FULL}$ and a second luminance signal $Y2_{FULL}$ in the "band-unlimited" frequency bands, respectively. The luminance signals $Y1_{FULL}$, $Y2_{FULL}$ are represented by the following equations.

$$Y1_{FULL} = C_1 \cdot R + C_2 \cdot G1 + C_3 \cdot B \qquad (16a)$$

$$Y2_{FULL} = C_1 \cdot R + C_2 \cdot G2 + C_3 \cdot B \qquad (16b)$$

In the above equations, $C_1$, $C_2$ and $C_3$ denote respective contributing coefficients of the input image signals R, G1 (G2) and B to the luminance component, respectively. In the high-vision signals, the coefficients $C_1$, $C_2$ and $C_3$ are 0.2126, 0.7152 and 0.0722, respectively.

On the other hand, the maximum/Y1Y2 calculating section 84 generates a first luminance signal $Y1_{LPF}$ and a second luminance signal $Y2_{LPF}$ in the "band-limited" frequency bands, respectively. These luminance signals $Y1_{LPF}$, $Y2_{LPF}$ are represented by the following equations.

$$Y1_{LPF} = C_1 \cdot R_{LPF} + C_2 \cdot G1_{LPF} + C_3 \cdot B_{LPF} \qquad (17a)$$

$$Y2_{LPF} = C_1 \cdot R_{LPF} + C_2 \cdot G2_{LPF} + C_3 \cdot B_{LPF} \qquad (17b)$$

It is noted here that the signal Y by the equation (11) is band-limited so as to have no high-frequency component. Therefore, in order to reproduce the high-frequency component of the signal, it is necessary to multiply the luminance signal in the equation (11) by a compensating term D thereby to output a "band-unlimited" luminance signal. Thus, the coefficient/luminance signal generating section 85 generates the luminance signals Y1, Y2 which are represented by the equations (2), (3). It will be understood that $Y1_{FULL}/Y1_{LPF}$ of the equation (2) corresponds to the above-mentioned compensating term D, while $Y2_{FULL}/Y2_{LPF}$ of the equation (3) corresponds to the compensating term D.

In FIG. 7, a Y1 gamma (γ) correcting section 88 applies a gamma (γ) correction to the luminance signal Y1 in the equation (2) brought from the coefficient/luminance signal generating section 85. Subsequently, the section 88 supplies the resulting signal (as a picture signal of 8 bits for Y1) to the Y1 device 63 in the optical system 74 of FIG. 5. Simultaneously, a Y2 gamma (γ) correcting section 89 applies a gamma (γ) correction to the luminance signal Y2 in the equation (3) brought from the coefficient/luminance signal generating section 85. Subsequently, the section 89 supplies the resulting signal (as a picture signal of 8 bits for Y2) to the Y2 device 58 in the optical system 74 of FIG. 5.

In addition, the gamma (γ) value (=γ1) at the rgb γ correcting section 88 and the gamma (γ) value (=γ2) at the Y1 γ correcting section 88 are allocated so as to represent a total of 2.2 under condition of multiplying the first modulated light by the second modulated light and also approach each other as possible. For instance, an allocation of γ1=1.0 and γ2=1.2 may be selected. Then, the total of both gamma (γ) values becomes 2.2 (=1.0+1.2) due to a multiplication between exponential parameters.

The so-constructed matrix conversion decoder 73 supplies the luminance signals Y1, Y2 and the color signals "r", "g" and "b" to the optical system 74. Then, through the optical system 74, a color image is projected on the screen (not shown).

In this way, with the constitution in accordance with the embodiment of FIG. 6, it becomes possible to eliminate the convergence correction. In addition, owing to the adoption of double modulation, it is possible to provide an ultrahigh-contrast image (more than 1000000:1) in comparison with the conventional system where two projectors are stacked on each other. Still further, the conversion to dual Y signals is attained by doubling a G signal, it is possible to provide an image with higher-definition.

Next, another embodiment of the projection display device of the present invention will be described below.

Figure 8:
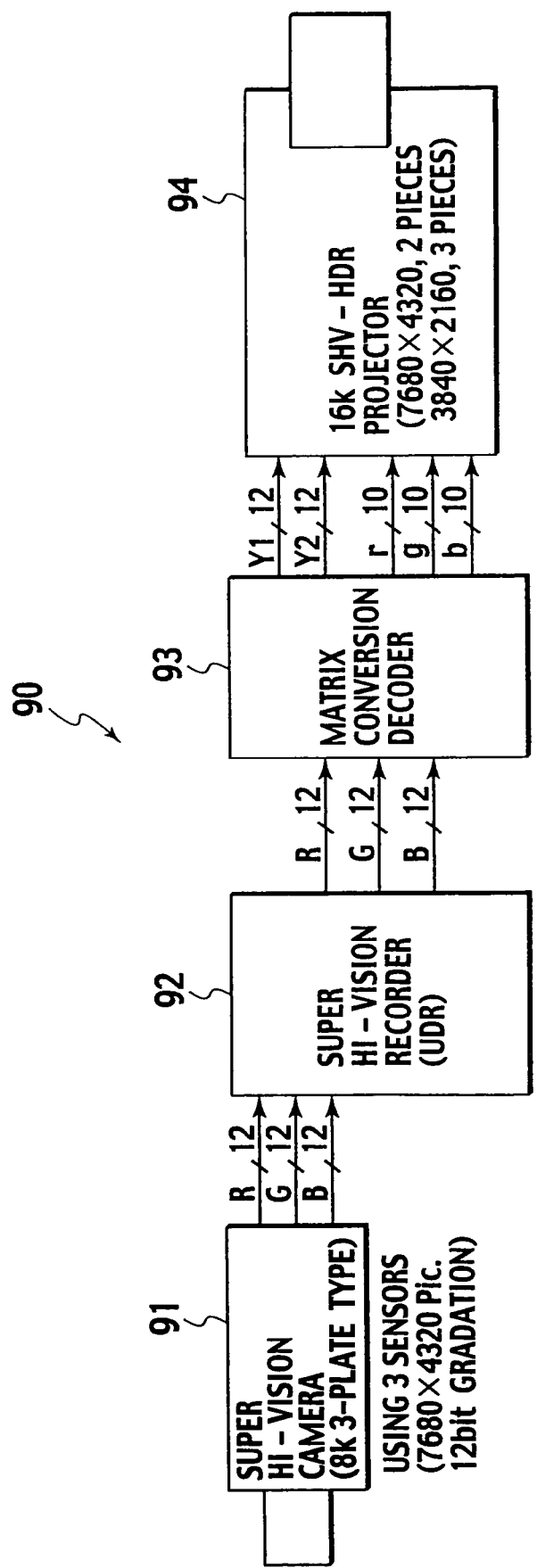
FIG. 8 is a structural view of a projection display device in accordance with another embodiment of the present invention.

FIG. 8 is a block diagram of the projection display device in accordance with another embodiment of the present invention. In FIG. 8, the projection display device 90 comprises a Super Hi-Vision camera 91 for taking a picture of a desired object, a Super Hi-Vision recorder 92 for recording and reproducing imaging signals of the Super Hi-Vision camera 91, a matrix conversion decoder 93 that inputs a green signal G a red signal R and a blue signal B from the recorder 92 and outputs two kinds of luminance signals Y1, Y2 and color signals "r", "g" and "b" as a result of matrix conversion of the above input 3-primary color signals and a 16 k SHV-HDR projector 94 for projecting an optical image on a not-shown screen.

Using three pieces of CMOS sensors each having 7,680 pixels in the horizontal direction and 4,320 pixels in the vertical direction (8 k×4 k) as the imaging devices, the Super Hi-Vision camera 91 is constructed so as to output 3-primary color signals of RGB, each in the quantifying bit number of 12 bits and at the frame rate of 60 p. The Super Hi-Vision recorder 92 is constructed so as to download/reproduce the output signals of the Super Hi-Vision camera 91 in the quantifying bit number of 12 bits. The transmission of signals is performed by an optical multiplexing method adopting HDMI (High-Definition Multimedia Interface) capable of transmitting 12 bits signals.

In the matrix conversion decoder 93, its basic constitution is similar to that of FIG. 7. The matrix conversion decoder 93 differs from the previous decoder 73 in that the amount of data is increased to 12 bits in the number of input/output bits. Additionally, the input signals include a single channel of green signal. The 16 k SHV-HDR projector 94 comprises a projector adopting the optical system of FIG. 5 and receives the luminance signals Y1, Y2 and the color signals "r", "g", "b" from the matrix conversion decoder 93, allowing an extremely high-definition image to be projected on a screen (not shown).

If only changing both the Y1 device 63 and the Y2 device 58 in the Y1-Y2 image-combining part 103 of FIG. 5 from 4 k pixels (horizontal: 4,096 pixels; vertical: 2,160 pixels) to 8 k pixels (horizontal: 8,192 pixels; vertical: 4,320 pixels), then the 16 k SHV-HDR projector 94 can project and display a super SHV projector image having a quad picture quality (corres. 16 k pixels) in comparison with the image by Super High-Vision (SHV) system having the best picture quality presently.

In this way, according to the embodiment, if such a "8 k-pixels" device having a higher resolving power than a "4 k-pixels" device is manufactured, then it is possible to attain the resolving power corresponding to 16 k pixels in the horizontal direction, approaching the resolution limit of human's eyes. If only increasing the resolving power so far, not only displaying of an image in the visual range of 180 degrees but application of this technique to an integral photography (IP) television etc. could be accomplished.

Finally, it will be understood by those skilled in the art that the foregoing descriptions are nothing but some embodiments and modifications of the disclosed optical system and projection display device and therefore, various changes and modifications may be made within the scope of claims.

What is claimed is:

1. An optical system comprising:
   a modulation optical system for combining respective modulated primary color lights with each other in wavelength thereby to produce and output a first composite light, the respective modulated primary color lights being provided by modulating 3-primary color lights by 3-primary color signals produced from an image signal individually,
   a separator for dividing the first composite light into a P-polarized light and a S-polarized light;
   a first modulation light generator for modulating the S-polarized light by one of two kinds of luminance signals produced from the image signal thereby to produce a first modulation light;
   a second modulation light generator for modulating the P-polarized light by the other of the luminance signals produced from the image signal thereby to produce a second modulation light;
   a photosynthesizer for combining the first modulation light with the second modulation light thereby to produce a second composite light; and
   a projector for projecting the second composite light, wherein:
   the first modulation light generator comprises a first device for modulating the S-polarized light, the first device having a number of first pixels,
   the second modulation light generator comprises a second device for modulating the P-polarized light, the first device having a number of second pixels, and wherein:
   each of the first pixels is shifted from each of the second pixels by a half of one pixel in horizontal and vertical directions, so that the first pixels and the second pixels are shifted from each other at a slant of 45 degrees by half pixel.

2. A projection display device comprising, using first and second primary color signals both composed of a plurality of primary color light components related to an image to be displayed, the device comprising:
   a first signal generator for generating a first band-unlimited luminance signal based on the first primary color signal and a second band-unlimited luminance signal based on the second primary color signal;
   a second signal generator for band-limiting the first and second primary color signals thereby to calculate a maximum of each of the first and second band-limited primary color signals with respect to each pixel and generating third and fourth band-limited luminance signals based on each of the first and second band-limited primary color signals;

a third signal generator for generating:
- color-signal correcting coefficients based on the maximum of the each of the first and second band-limited primary color signals with respect to each pixel, the maximum obtained by the second signal generator,
- a first display luminance signal based on the maximum of the each of the first and second band-limited primary color signals with respect to each pixel and the first and third luminance signals, and
- a second display luminance signal based on the maximum of the each of the first and second band-limited primary color signals with respect to each pixel and the second and fourth luminance signals;

a fourth signal generator for multiplying the color-signal correcting coefficients by the first and second band-limited primary color signals thereby to generate 3-primary color display signals;

a modulation optical system that wavelength-combines respective modulation primary color signals obtained by modulating the 3-primary color display signals with respect to each primary color thereby to produce and output a first composite light;

a separator for dividing the first composite light into a P-polarized light and a S-polarized light;

a first modulation light generator for modulating the S-polarized light by the first display luminance signal thereby to produce a first modulation light;

a second modulation light generator for modulating the P-polarized light by the second display luminance signal thereby to produce a second modulation light;

a photosynthesizer for combining the first modulation light with the second modulation light thereby to produce a second composite light; and a projector for projecting the second composite light.

3. The projection display device of claim 2, further comprising:

first and second image pickup devices for green light, the first image pickup device having a number of first pixels, the second image pickup device having a number of second pixels;

a third image pickup device for blue light; and a fourth image pickup device for red light, wherein each of the first pixels of the first image pickup device is shifted from each of the second pixels of the second image pickup device by a half of one pixel in horizontal and vertical directions, so that the first pixels and the second pixels are shifted from each other at a slant of 45 degrees by half pixel, and wherein the first signal generating means is configured so as to input:
- the first primary color signal composed of the primary color light components related to the image to be displayed and also outputted from the first, third and fourth image pickup devices; and
- the second primary color signal composed of the primary color light components related to the image to be displayed and also outputted from the second, third and fourth image pickup devices, thereby to generate the first band-unlimited luminance signal based on the first primary color signal and the second band-unlimited luminance signal based on the second primary color signal.

4. The projection display device of claim 3, wherein:

the first modulation light generator comprises a first device for modulating the S-polarized light, the first device having a number of first pixels, and the second modulation light generator comprises a second device for modulating the P-polarized light, the first device having a number of second pixels, and wherein:

each of the first pixels is shifted from each of the second pixels by a half of one pixel in horizontal and vertical directions, so that the first pixels and the second pixels are shifted from each other at a slant of 45 degrees by half pixel.

* * * * *